US010236807B2

(12) United States Patent
Kamio

(10) Patent No.: US 10,236,807 B2
(45) Date of Patent: Mar. 19, 2019

(54) SHIFT RANGE CONTROLLER

(71) Applicant: DENSO CORPORATION, Kariya, Aichi-pref. (JP)

(72) Inventor: Shigeru Kamio, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/786,940

(22) Filed: Oct. 18, 2017

(65) Prior Publication Data

US 2018/0115262 A1     Apr. 26, 2018

(30) Foreign Application Priority Data

Oct. 26, 2016   (JP) .................................. 2016-209324

(51) Int. Cl.
  *G05B 11/01*  (2006.01)
  *H02P 6/16*   (2016.01)
  *H02P 6/08*   (2016.01)
(52) U.S. Cl.
  CPC . *H02P 6/16* (2013.01); *H02P 6/08* (2013.01)
(58) Field of Classification Search
  CPC ............. H02P 6/30; H02P 6/24; H02P 25/085
  See application file for complete search history.

(56) References Cited

U.S. PATENT DOCUMENTS

2005/0174084 A1     8/2005  Nakai et al.
2017/0307072 A1*   10/2017  Yamada ................. F16H 61/24

\* cited by examiner

*Primary Examiner* — Karen Masih
(74) *Attorney, Agent, or Firm* — Nixon & Vanderhye PC

(57) ABSTRACT

A shift range controller includes a target angle setter obtaining, from an output shaft sensor, sensor signals provided by switches. The target angle setter corrects a target count value that corresponds to a requested shift range, based on the respective sensor signals. When a legitimate number of edges are detected within a signal detection range, or an edge detection window for detecting at least one of the sensor signals (e.g., P1 signal), the target angle setter calculates a post-correction target count value based on an actual count value at an edge detection timing. When the number of edges detected in the detection window is greater than the legitimate number, or, when the edge is detected at a position outside the detection window for at least one of the sensor signals, the target angle setter invalidates the correction of the target count value based at least on the one of the sensor signals.

3 Claims, 13 Drawing Sheets

SHIFT RANGE CONTROLLER

CROSS REFERENCE TO RELATED APPLICATION

The present application is based on and claims the benefit of priority of Japanese Patent Application No. 2016-209324, filed on Oct. 26, 2016, the disclosure of which is incorporated herein by reference.

TECHNICAL FIELD

The present disclosure generally relates to a shift range controller.

BACKGROUND INFORMATION

Conventionally, a shift range switch device controls the switching between a plurality of shift ranges in response to a driver's request for switching the shift ranges. For example, a system/controller described in patent document 1 below includes an output shaft sensor that detects a rotation angle of an output shaft engaged with a rotation shaft of a speed reduction mechanism for reducing a rotation speed of a motor.

(Patent document 1) Japanese Patent No. 4385768

The patent document 1 shows, as an example of the output shaft sensor, (i) a potentiometer that generates a linearly changing output voltage based on the rotation angle of the output shaft or (ii) a switch that turns ON at a position in a rotation angle range that corresponds to each of the shift ranges. In instances where the switch is used as the output shaft sensor for setting a target position of the motor based on the output of the switch, motor control may be affected due to an abrasive powder or an electrical noise that hinders a detection of the sensor signal edges.

SUMMARY

It is an object of the present disclosure to provide a shift range controller that improves the setting of a motor angle target value based on a requested shift range.

In an aspect of the present disclosure, the shift range controller switches shift ranges by controlling a drive of a motor. The shift range controller includes a target angle setter and a drive controller.

The target angle setter obtains, from an output shaft sensor, a plurality of output shaft signals respectively generated by a plurality of switches, and corrects a motor angle target value that corresponds to a requested shift range according to respective output shaft signals. The output shaft sensor includes the plurality of switches that turn ON and OFF at shift-range corresponding rotation positions of the output shaft to which the rotation drive of the motor is transmitted.

The drive controller controls the drive of the motor based on the motor angle target value.

The output shaft signal has a rising edge and a falling edge, which are collectively designated as an edge.

The target angle setter calculates a post-correction motor angle target value based on a motor angle at an edge detection timing when a legitimate number of edges is detected in a detection range for each of the output shaft signals.

Further, when the number of edges detected in the detection range is greater than the legitimate number, or when the edge is detected outside the detection range, the target angle setter invalidates a correction of the motor angle target value based on the relevant output shaft signal.

The present disclosure appropriately corrects the motor angle target value based on at least one normal output shaft signal, because the correction of the motor angle target value is appropriately performable when at least one signal is normal from among the plurality of output shaft signals that are generated/output from the plurality of switches in the output shaft sensor.

Further, when the number of edges detected in the detection range is greater than the legitimate or normal number of edges, or when the edge is detected outside of the detection range, the output shaft signal corresponding to such detected edge(s) may include signal noise and/or signal chatter, and the correction of the motor angle target value based on such output shaft signal is invalidated.

In such manner, erroneous correction of the motor angle target value affected by noise and/or chatter is limited or prevented.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Hereafter, the shift range controller of the present disclosure is described based on the drawings.

Figure 1:
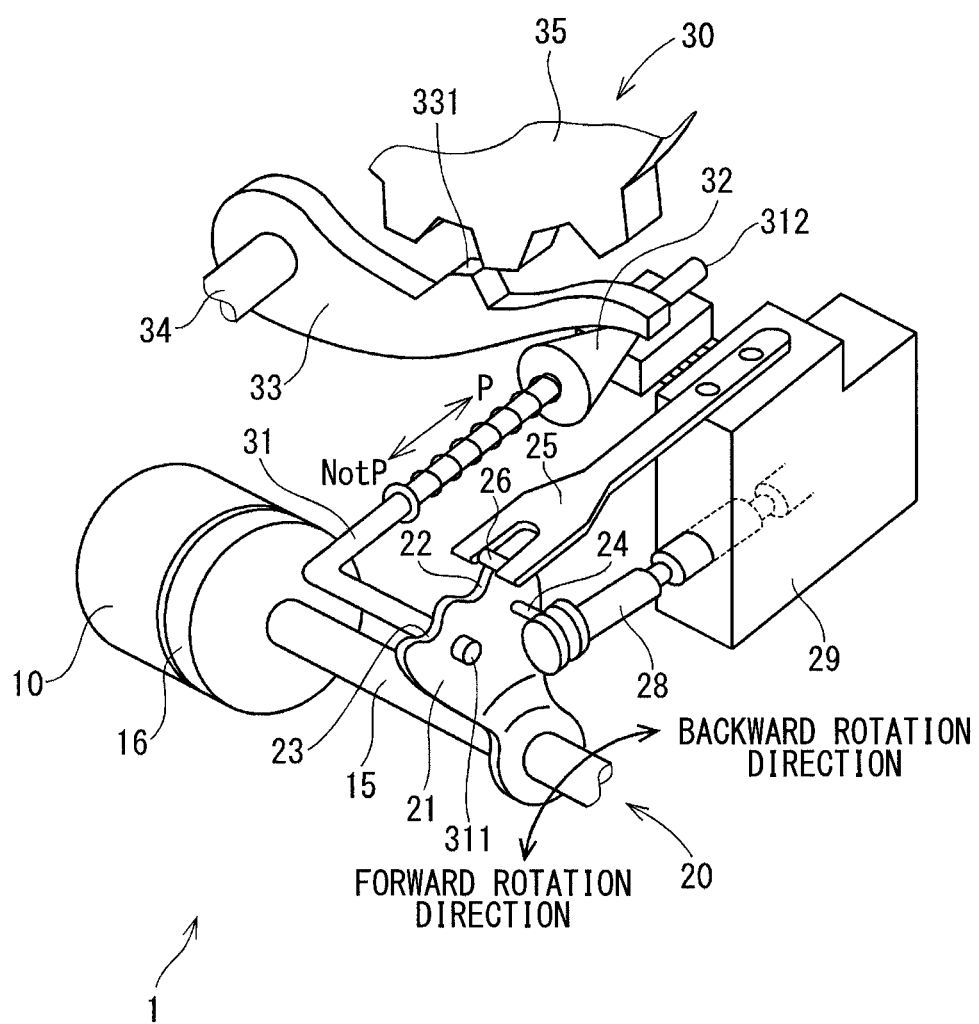
FIG. 1 illustrates a perspective view of a shift-by-wire system.
Figure 2:
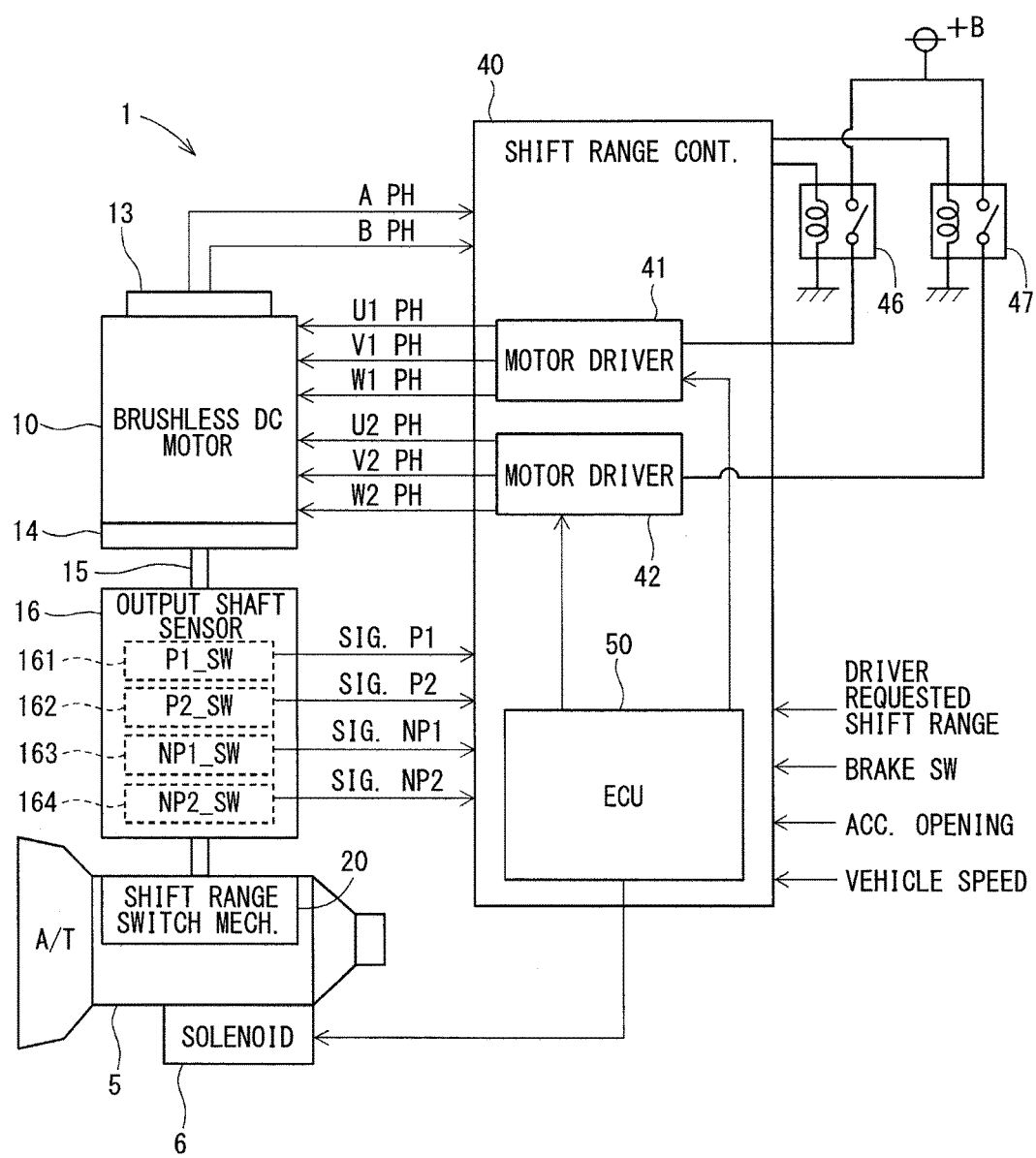
FIG. 2 illustrates a block diagram of the shift-by-wire system.

As shown in FIGS. 1 and 2, a shift-by-wire system 1 may include a motor 10, a shift range switch mechanism 20, a parking lock mechanism 30, a shift range controller 40, and the like.

Figure 4:
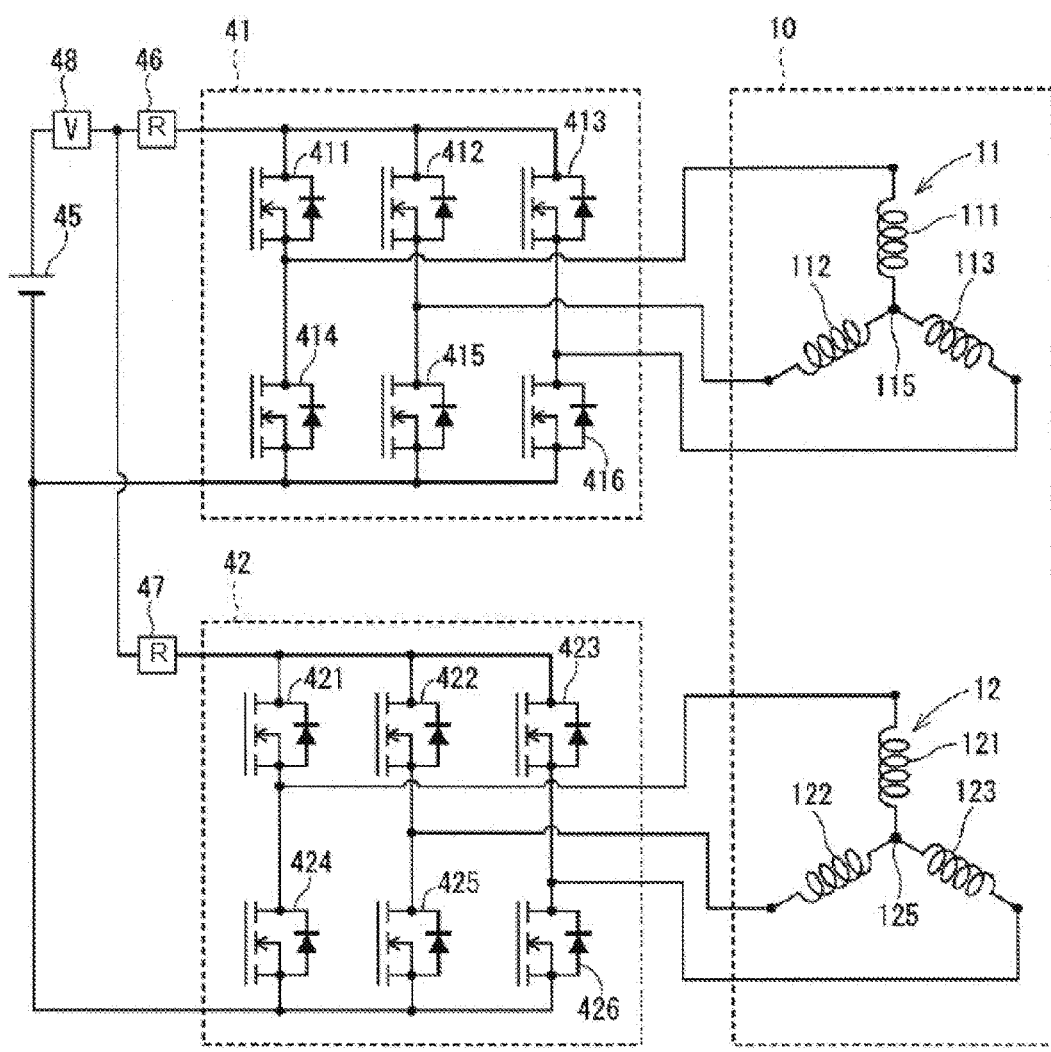
FIG. 4 illustrates a circuit diagram of a motor and a motor driver.

Electric power supplied from a battery 45 (FIG. 4) is used to rotate motor 10 to provide drive power to the shift range switch mechanism 20. Using feedback control, the motor 10 may receive a variable magnitude of electric current, and control instructions for the motor 10 may also change for each of the various phases. The motor 10 of the present embodiment may be a permanent magnet-type DC brushless motor. As shown in FIG. 4, the motor 10 has 2 sets of winding groups, a first winding group 11 and a second winding group 12. The first winding group 11 has a U1 coil 111, a V1 coil 112, and a W1 coil 113. The second winding group 12 has a U2 coil 121, a V2 coil 122, and a W2 coil 123.

As shown in FIG. 2, an encoder 13 detects a rotation position of a rotor (not illustrated) in the motor 10. The encoder 13 may be magnetic-type rotary encoder of magnetic type that includes a magnet which rotates with the rotor and a Hall IC for magnetic detection. The encoder 13 outputs a pulse signal of an A phase and a pulse signal of a B phase at a predetermined angle synchronized with the rotation of the rotor.

A decelerator (also referred to herein as a speed reducer) 14 is disposed at a position between a motor shaft 105 (refer to FIG. 8) of the motor 10 and an output shaft 15. The decelerator 14 slows down a rotation speed of the motor shaft 105 of the motor 10, and outputs the rotation to the output shaft 15. Thereby, rotation of the motor 10 is transmitted to the shift range switch mechanism 20.

An output shaft sensor 16 is disposed on the output shaft 15 and detects a rotation position of the output shaft 15. The output shaft sensor 16 has switches 161-164 that are all contact-type switches. The switches 161 and 162 are for detecting a P range, and the switches 163 and 164 are for detecting a range other than the P range (i.e., a NotP range). That is, according to the present embodiment, a signal indicating P range detection and a signal indicating NotP range detection are provided respectively as dual signals, that is, as a dual system or a duplex system.

A signal P1 is indicative of the ON-OFF state of the switch 161, a signal P2 is indicative of the ON-OFF state of the switch 162, a signal NP1 is indicative of the ON-OFF state of the switch 163, and a signal NP2 is indicative of the ON-OFF state of the switch 164. As shown in FIG. 2, the switch 161 is designated as "P1_SW", the switch 162 is designated as "P2_SW", the switch 163 is designated as "NP1_SW", and the switch 164 is designated as "NP2_SW".

Figure 3:
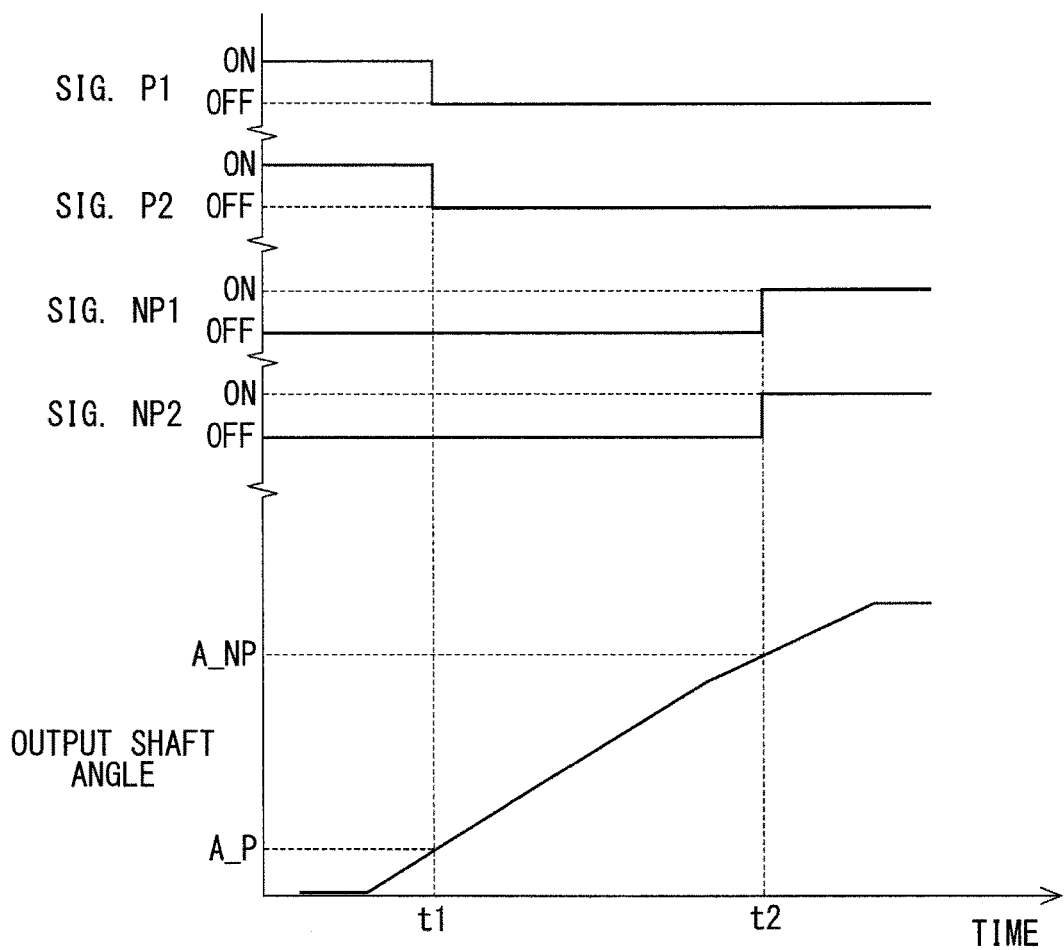
FIG. 3 illustrates a timing diagram of a relationship between an output shaft angle and an ON-OFF state of output shaft sensor switches.

As shown in FIG. 3, the P range switches 161 and 162 are configured to turn ON-OFF at an angle A_P corresponding to the P range of the output shaft 15. The NotP range switches 163 and 164 are configured to turn ON-OFF at an angle A_NP corresponding to the NotP range of the output shaft 15. As described above, the NotP range is a shift range other than the P range.

When switching a shift range from the P range to the NotP range, the signals P1 and P2 both switch from ON to OFF at time t1 when the output shaft 15 reaches the angle A_P, and the signals NP1 and NP2 both switch from OFF to ON at time t2 when the output shaft 15 reaches the angle A_NP.

The signals P1, P2, NP1, and NP2 are output to the shift range controller 40. The shift range controller 40 is enabled to detect the current shift range based on an ON-OFF state of the signals P1, P2, NP1, and NP2.

Notwithstanding detection errors where the signals P1 and P2 may differ, the signals P1 and P2 may be collectively designated as a "signal P," because the signals P1 and P2 are basically the same shaped waveform. Similarly, the signals NP1 and NP2 may be collectively designated as a "signal NP."

As shown in FIG. 1, the shift range switch mechanism 20 has a detent plate 21, a detent spring 25 and the like, and transmits a rotational driving force output from the decelerator 14 to a manual valve 28 and the parking lock mechanism 30.

The detent plate 21 is fixed to the output shaft 15, and is driven by the motor 10. According to the present embodiment, a rotation direction of the detent plate 21 is designated as a forward rotation direction when the detent plate 21 rotates away from the detent spring 25, and as a backward rotation direction when the detent plate 21 rotates toward the detent spring 25.

The detent plate 21 has a pin 24 disposed thereon that extends longitudinally from the detent plate 21 in a direction parallel to the output shaft 15. The pin 24 is connected with the manual valve 28. Movement of the manual value 28 reciprocates along its axial direction based on the forward and backward rotation of the detent plate 21. That is, the shift range switch mechanism 20 converts a rotational movement of the motor 10 into a translational and reciprocal movement, and transmits the movement to the manual valve 28. The manual valve 28 is disposed in a valve body 29. Based on the reciprocal movement of the manual valve 28 along the axial direction, a hydraulic pressure supply path to a hydraulic clutch (not illustrated) is switched, and an engagement state of the hydraulic clutch is switched, thereby changing the shift ranges.

Two concave-shaped recesses 22 and 23 are provided on one side of the detent plate 21 in contact with portions of the detent spring 25. As shown in FIG. 1, the recess 22 is positioned closer to the detent spring 25 than the recess 23. The recess 22 corresponds to the NotP range, and the recess 23 corresponds to the P range.

The detent spring 25 is a board member that is elastically deformable, and has a detent roller 26 disposed at a tip. The detent spring 25 biases the detent roller 26 toward the rotational center of the detent plate 21. When a torque more than a predetermined magnitude is applied to the detent plate 21, the detent spring 25 is elastically deformed, and the detent roller 26 moves between the recesses 22 and 23. When the detent roller 26 is positioned within and engages either of the two recesses 22 and 23, the swing motion of the detent plate 21 is regulated, the axial position of the manual valve 28 and the state of the parking lock mechanism 30 are determined, and the shift range of the automatic transmission 5 is fixed. When the shift range is the NotP range, the detent roller 26 is positioned within and engages recess 22, and when the shift range is the P range, the detent roller 26 is positioned within and engages the recess 23. As used herein, the recess 22 may be referred to as the NotP range recess 22, and the recess 23 may be referred to as the P range recess 23.

The parking lock mechanism 30 has a parking rod 31, a cone 32, a parking lock pole 33, a shaft 34, and a parking gear 35.

The parking rod 31 is formed in an L-shape, with one end 311 fixed to the detent plate 21. The cone 32 is disposed on another end 312 of the parking rod 31. The radius of cone 32 decreases in the direction toward the end 312. When the detent plate 21 rotates in the backward rotation direction, the cone 32 moves in a P direction.

The parking lock pole 33 swings about shaft 34 and abuts or contacts a conical surface of the cone 32. On a side of the parking lock pole 33 closest to the parking gear 35, a convex-shaped tooth 331 extends from the parking lock pole. The tooth 331 is configured to engage the parking gear 35 based on a position of the parking rod 31. That is, when the detent plate 21 rotates in the backward rotation direction and the cone 32 moves in the P direction, the conical surface of the cone 32 increases in radius such that the parking lock pole 33 in contact with the cone 32 is urged upward so that the tooth 331 engages the parking gear 35. On the other hand, when the detent plate 21 rotates in the forward rotation direction and the cone 32 moves in the NotP direction, the parking lock pole rotates away from the parking gear 35 such that the tooth 331 disengages and releases the parking gear 35.

The parking gear 35 is disposed on an axle (not illustrated), and is engageable with the tooth 331 of the parking lock pole 33. When the tooth 331 engages the parking gear 35, a rotation of the axle is limited to prevent rotation of the axle. When the shift range is the NotP range, the parking gear 35 is not locked by the parking lock pole 33, and the rotation of the axle is not hindered by the parking lock mechanism 30. When the shift range is the P range, the parking gear 35 is locked by the parking lock pole 33, and the rotation of the axle is limited to prevent rotation of the axle.

As shown in FIGS. 2 and 4, the shift range controller 40 has motor drivers 41 and 42, and an ECU 50.

The motor driver 41 may be a three-phase inverter that switches a power supply of the first winding group 11. The motor driver 41 may be configured as a bridge-type circuit with switching elements 411-416. An end of a U1 coil 111 is connected to a junction point between the switching elements 411 and 414 of the U phase, which make a pair. An end of a V1 coil 112 is connected to a junction point between the switching elements 412 and 415 of the V phase, which make a pair. An end of a W1 coil 113 is connected to a junction point between the switching elements 413 and 416 of the W phase, which make a pair. Connection among the other ends of the coils 111-113 is established by a connection part 115.

The motor driver 42 may be a three-phase inverter that switches a power supply of the second winding group 12. The motor driver 42 may be configured as a bridge-type circuit with switching elements 421-426. An end of a U2 coil 121 is connected to a junction point between the switching elements 421 and 424 of the U phase, which make a pair. An end of a V2 coil 122 is connected to a junction point between the switching elements 422 and 425 of the V phase, which make a pair. An end of a W2 coil 123 is connected to a junction point between the switching elements 423 and 426 of the W phase, which make a pair. Connection among the other ends of the coils 121-123 is established by a connection part 125.

The switching elements 411-416 and 421-426 of the present embodiment are implemented as MOSFETs, even though the switching elements 411-416 and 421-426 may also be implemented as other switching elements, such as IGBTs.

A motor relay 46 is disposed between the motor driver 41 and the battery 45. A motor relay 47 is disposed between the motor driver 42 and the battery 45. The motor relays 46 and 47 are turned ON when a start switch, which may be an ignition switch etc., is turned ON, and an electric power is supplied to the motor 10. The motor relays 46 and 47 are turned OFF when the start switch is turned OFF, and the supply of electric power to the motor 10 is interrupted.

A voltage sensor 48 that detects a battery voltage V is disposed on a high potential side of the battery 45.

Electric current sensors (not illustrated) that detect a motor current Im are provided in the motor drivers 41 and 42.

The ECU 50 controls the drive of the motor 10, by controlling an ON-OFF operation of the switching elements 411-416 and 421-426. The ECU 50 also controls the drive of an oil-pressure-controlled solenoid 6 for changing gears based on a vehicle speed, an accelerator opening, a driver requested shift range, and the like. A gear of the automatic transmission 5 is controlled by controlling the oil-pressure-controlled solenoid 6 used for changing gears. The number of the oil-pressure-controlled solenoids 6 is set according to the number of the gears or the like. Although one ECU 50 is provided to control the drive of both of the motor 10 and the solenoid 6 in the present embodiment, separate ECUs such as a motor ECU for motor control, i.e., for a control of the motor 10, and an automatic transmission ECU "AT-ECU" for solenoid control may be provided.

Figure 5:
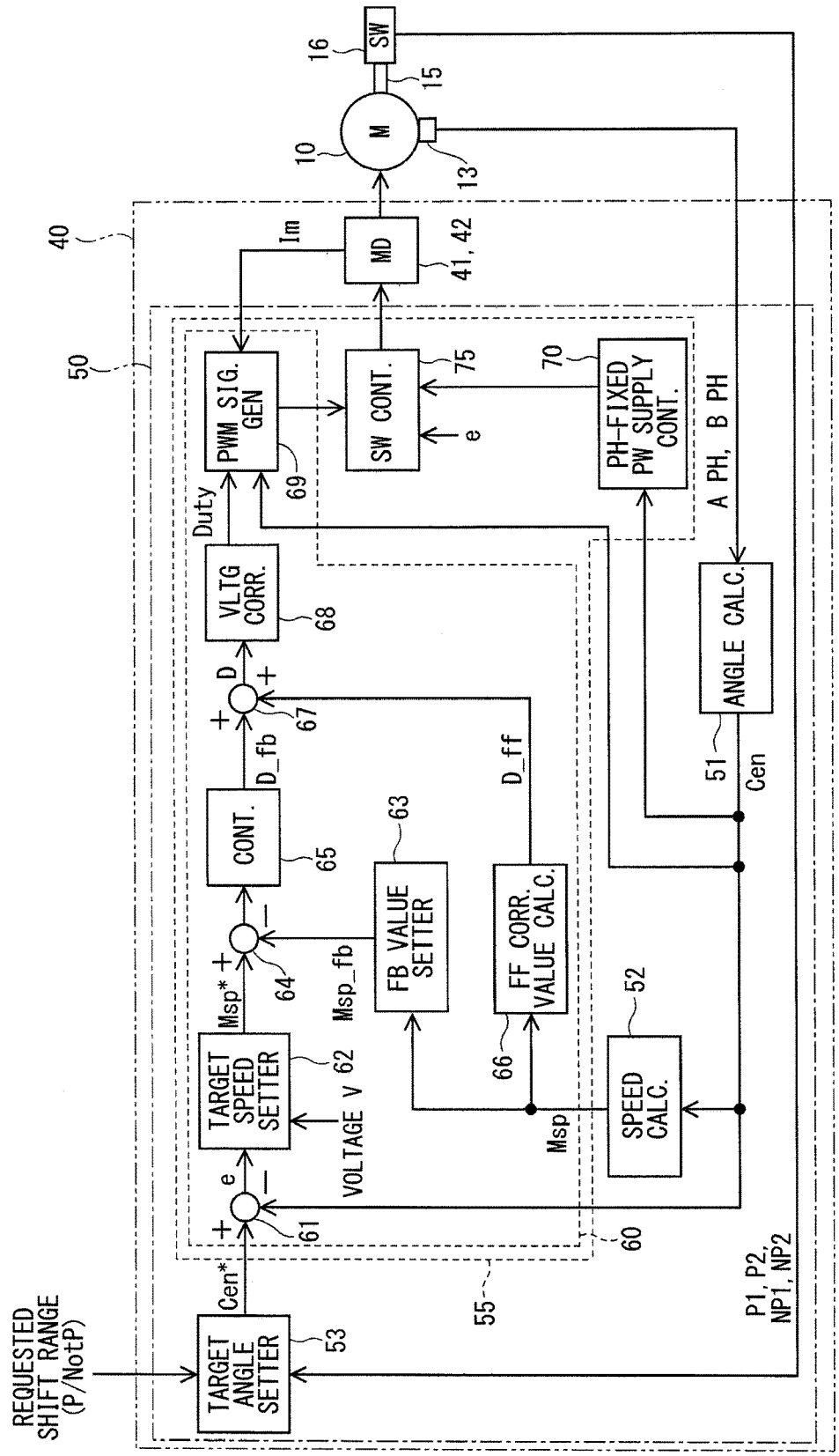
FIG. 5 illustrates a block diagram of a shift range controller in one embodiment of the present disclosure.

As shown in FIG. 5, the ECU 50 is provided with an angle calculator 51, a speed calculator 52, a target angle setter 53, and a drive controller 55. ECU 50 may be implemented as a microcomputer, or a microcomputer or a like processor may be provided as the main component of the ECU 50.

Each of various processes in the ECU 50 may be performed using software processing by executing a program stored in non-transitory storage devices such as a ROM, by using a CPU. Alternatively, the various processes may be processed by hardware such as a dedicated electronic circuit used for the processing.

The angle calculator 51 calculates an actual count value Cen that is a count value of the encoder 13 based on the pulse of the A phase and the B phase output from the encoder 13. The actual count value Cen is a value based on an actual mechanical angle and an actual electrical angle of the motor 10. The actual count value Cen may also be designated as an "actual angle."

The speed calculator 52 calculates a motor speed Msp that is a rotation speed of the motor 10 based on the actual count value Cen.

The target angle setter 53 sets a target count value Cen* based on the driver-requested shift range that is input by an operation of a shift lever or the like (not illustrated). A setup and correction of the target count value Cen* by the target angle setter 53 are described in further detail below.

The drive controller 55 has a feedback controller 60, a phase-fixed power supply controller 70, and a switch controller 75. The drive controller 55 generates a drive signal for drive control of the motor 10 based on the target count value Cen*.

The feedback controller 60 includes an angle deviation calculator 61, a target speed setter 62, a feedback value setter 63, a speed deviation calculator 64, a controller 65, a feed-forward correction value calculator 66, a feed-forward term corrector 67, a voltage corrector 68, and a PWM signal generator 69. As used herein, feedback may be abbreviated "FB" and feed forward may be abbreviated "FF."

The angle deviation calculator 61 calculates a difference between the target count value Cen* and the actual count value Cen. As used herein, an absolute value of the difference between the target count value Cen* and the actual count value Cen is designated as an angle deviation "e."

Figure 6:
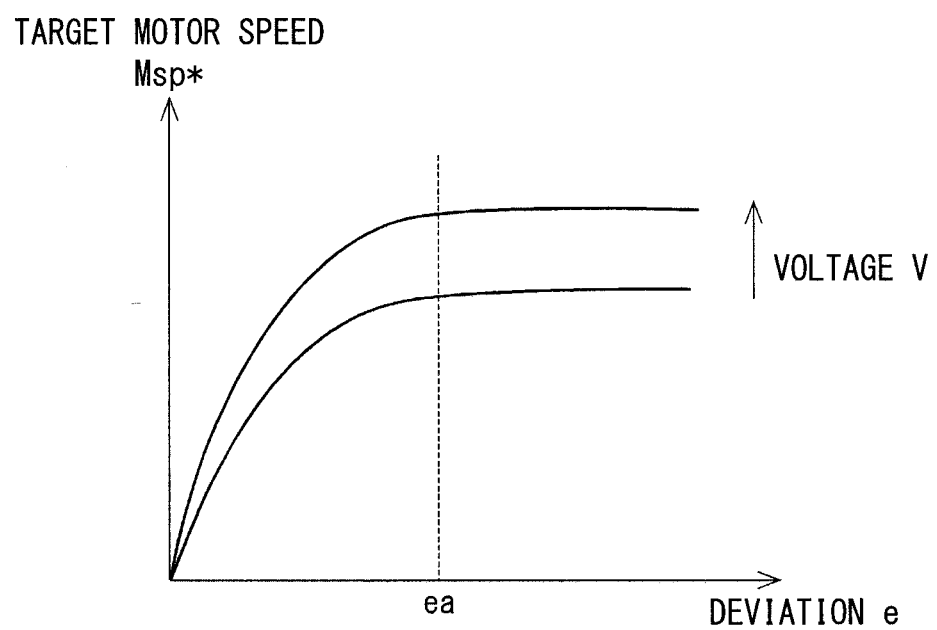
FIG. 6 illustrates a diagram of a target speed setting in one embodiment of the present disclosure.

The target speed setter 62 calculates a target motor speed Msp* that is a target speed of rotation of the motor 10 based on the angle deviation e. With reference to the map shown in FIG. 6, a target motor speed Msp* is set to a larger value as the angle deviation e increases when the angle deviation e is equal to or smaller than a predetermined value ea. The target motor speed Msp* is set to a predetermined maximum value, when the angle deviation e is greater than the predetermined value ea. The target motor speed Msp* may also be set to a larger value as the battery voltage V increases.

The FB value setter 63 sets a speed feedback value "Msp_fb" used as a feedback value based on the speed state of the motor 10.

The speed state of the motor 10 may be defined either as an acceleration state, a steady state, or a deceleration state. The speed states may be designated as speed modes, wherein the acceleration state may be designated as a "mode 1", the steady state may be designated as a "mode 2", and the deceleration state may be designated as a "mode 3". A state in which a phase-fixed power supply is used to power motor 10 may be designated as "mode 4", and a power supply OFF state may be designated as a "mode 0". The phase-fixed power supply will be explained in further detail below. Each of these modes may also be designated as a "control mode," as described below.

When the speed state of the motor 10 is mode 2 or mode 3, i.e., the steady state or the deceleration state, the FB value setter 63 performs a phase advance correction/compensation, in which the phase of the motor speed Msp is advanced, and sets a speed phase advance value Msp_pl as the speed feedback value Msp_fb. Further, when the speed state of the motor 10 is mode 1, i.e., is the acceleration state, the FB value setter 63 does not perform the phase advance correction/compensation, and sets the motor speed Msp to the speed feedback value Msp_fb. The concept/notion of a "motor speed" includes the speed phase advance value Msp_pl.

The speed deviation calculator 64 calculates a speed deviation AMsp between the target motor speed Msp* and the speed feedback value Msp_fb.

The controller 65 may calculate an FB duty D_fb for a P control, a PI control, or the like, for the matching of the target motor speed Msp* and the speed feedback value Msp_fb, that is, to reduce the speed deviation AMsp to zero.

The FF correction value calculator 66 calculates an FF duty D_ff according to the speed state of the motor 10.

Figure 7A:
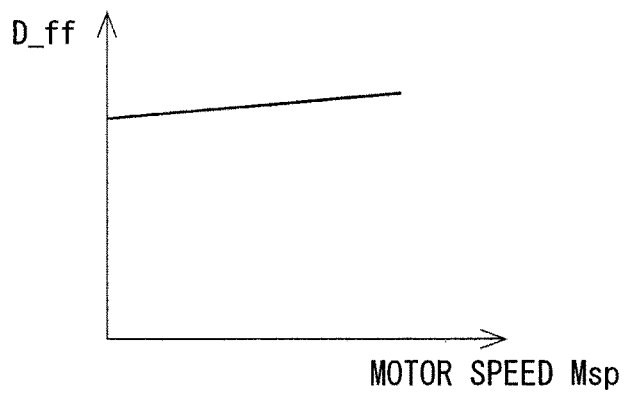
FIGS. 7A, 7B, 7C illustrate feed-forward (FF) duty diagrams.

The FF duty D_ff in the acceleration state is the maximum acceleration duty calculated based on the maps in FIG. 7A, where the FF duty D_ff takes a larger value as the motor speed Msp increases. According to the present embodiment, the FF duty D_ff is calculated as the maximum duty during a period in which the motor speed Msp reaches and exceeds the target motor speed Msp*.

Figure 7B:
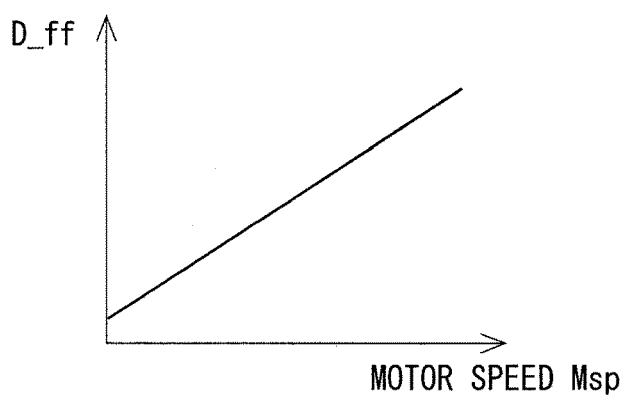

The FF duty D_ff in the steady state is a speed keeping duty calculated based on the map in FIG. 7B. The speed keeping duty is a duty for keeping the motor speed Msp at the time of no load that takes a larger value as the motor speed Msp increases.

Figure 7C:
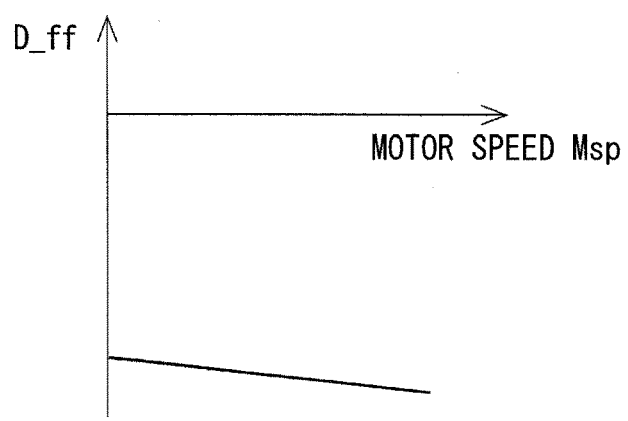

The FF duty D_ff in the deceleration state is a deceleration correction duty calculated based on the map in FIG. 7C. The deceleration correction duty is a correction duty for realizing the target motor speed Msp*. The deceleration correction duty is a negative value when the motor 10 is rotating in the forward rotation direction that takes a smaller value as the motor speed Msp increases. That is, the deceleration correction duty takes a larger absolute value as the motor speed Msp increases.

FIGS. 7A, 7B, and 7C respectively show a situation in which the motor 10 is rotating in the forward rotation direction. When the motor 10 is rotating in the backward rotation direction, the positive and negative values of the FF duty D_ff are reversed. The FF duty D_ff calculated based on the motor speed Msp in the present embodiment may also be calculated based on the target motor speed Msp*.

The FF term corrector 67 corrects the FB duty D_fb by the FF duty D_ff, and calculates a duty instruction value. The FF term corrector 67 of the present embodiment may be an adder that adds the FF duty D_ff to the FB duty D_fb, and calculates a duty instruction value D.

The voltage corrector 68 corrects the duty instruction value D based on the battery voltage V. As used herein, the duty instruction value D after voltage correction by voltage corrector 68 is designated as a "duty instruction value," or "Duty," as shown in FIG. 5.

The PWM signal generator 69 generates an instruction signal for the switching of the switching elements 411-416 and 421-426 based on the duty instruction value and the actual count value Cen. The instruction signal is adjusted so that the motor current Im does not exceed a current limit value Im_max.

The drive of the motor 10 is controlled by a square wave from a power supply with a 120-degree phase offset. In the square wave control, the switching element on a high potential side of the first phase and the switching element on a low potential side of the second phase are turned ON. By replacing a combination of the first phase and the second phase at every 60 degrees of the electrical angle, the power supply phase is switched. Thereby, a rotating magnetic field is generated in the winding groups 11 and 12, and the motor 10 rotates. According to the present embodiment, a rotation direction of the motor 10 for rotating the output shaft 15 in the forward rotation direction is designated as a positive direction.

The phase-fixed power supply controller 70 performs a phase-fixed power supply control. The phase-fixed power supply control is a control performed for stopping the rotation of the motor 10, in which a fixed phase is selected according the electrical angle and the switching elements 411-416 and 421-426 control the direction of the electric current flow in the selected fixed phase. In such a way, the excitation phase of the motor 10 is fixed. By fixing the excitation phase, the motor 10 stops at a certain electrical angle that corresponds to the excitation phase. The phase-fixed power supply controller 70 selects a fixed phase and a power supply direction based on the actual count value Cen so that the motor 10 is stopped at the nearest electrical angle from the current rotor position.

The phase-fixed power supply control is a control that is performed when the angle deviation e is equal to or smaller than an angle determination threshold e_th. When the phase-fixed power supply control is performed, the actual count value Cen and the target count value Cen* substantially match each other. Therefore, the motor 10 can be stopped at a position that substantially matches the target count value Cen*, by stopping at the nearest stoppable electrical angle from the current rotor position. The electrical angle corresponding to the target count value Cen* and the electrical angle at which the motor 10 is stopped in the phase-fixed power supply control are different. However, such a difference may be ignorable when a speed reduction ratio of the decelerator 14 is large, which makes only a small error for the stop position of the output shaft 15 due to the above difference.

The switch controller 75 switches the control state of the motor 10. In particular, the switch controller 75 switches whether to perform a feedback control or a phase-fixed power supply control based on the angle deviatione.

The switch controller 75 outputs the drive signal according to the control state to the motor drivers 41 and 42 to control the drive of the motor 10.

Figure 8:
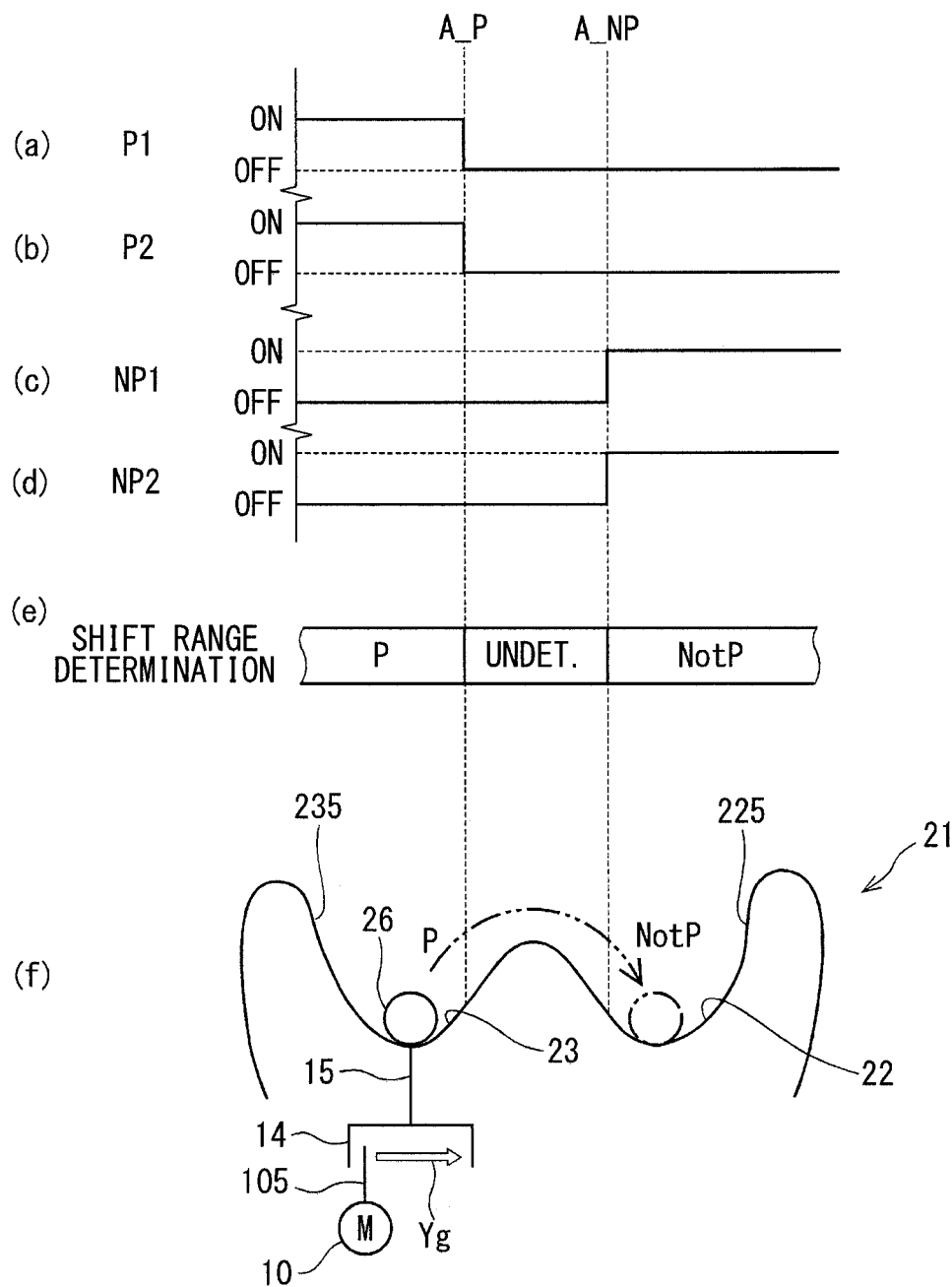
FIG. 8 illustrates how a shift range is determined based on an output shaft signal.

FIG. 8 describes a relationship among the motor 10, the output shaft 15, and the detent plate 21. In FIG. 8, part (a) shows the signal P1, part (b) shows the signal P2, part (c) shows the signal NP1, part (d) shows the signal NP2, and part (e) shows a range determination based on the signal from the output shaft sensor 16. Part (f) illustrates a movement of the detent roller 26 according to the rotation of the motor 10. FIG. 8 describes a situation in which the shift range is switched from the P range to the NotP range.

In part (f) of FIG. 8, based on the rotation of the motor 10, the detent roller 26 traverses over a crest between the recesses 22 and 23 of the detent plate 21 to move from the P range recess 23 to the NotP range the recess 22, i.e., as shown by the dashed-line arrow in part (f) of FIG. 8. In FIG. 8, the rotation direction of the motor 10 and the output shaft 15 is described as a right-left direction on a surface of the drawing. In FIG. 8, there may be an amount of play (i.e. small degree of movement) between the motor shaft 105 and the decelerator 14 based on an assumption that the output shaft 15 and the decelerator 14 are formed in one body. However, there may also be a certain amount of play between the decelerator 14 and the output shaft 15 based on an assumption that the motor shaft 105 and the decelerator 14 are formed in one body. Even though the output shaft 15 and the detent plate 21 are driven and rotated by the rotation of the motor 10 to move the detent plate 21 relative to the detent roller 26, the following description is simplified to describe the position of the detent roller 26 relative to the drive of the motor 10.

In FIG. 8, as shown in the part (a) to the part (d), when the output shaft 15 rotates based on the rotation of the motor 10, the signals P1, P2 switch from ON to OFF when the output shaft angle reaches the angle A_P, and the signals NP1 and NP2 switch from OFF to ON when the output shaft angle reaches the angle A_NP. Although the signals P1 and P2 are supposed to simultaneously switch from ON to OFF in FIG. 8, the switch timing of the signal P1 and the switch timing of the signal P2 may be different due to a detection error or like error that may be designated as an "edge variation" or "edge deviation." Similar errors affecting the NP1 and NP2 signals may also be designated as edge variations or edge deviations.

As shown in part (e) of FIG. 8, when the P1 and P2 switches are in the ON state and the NP1 and NP2 switches are in the OFF state, as shown in parts (a)-(d), the ECU 50 determines that the shift range is in the P range. When the NP1 and NP2 switches are in the ON state and the P1 and P2 switches are in the OFF state, the ECU 50 determines that the shift range is in the NotP range. When each of the P1, P2, NP1, and NP2 switches are in the OFF state, the shift range is in the "undefined" or "undetermined" range.

As shown in part (f) of FIG. 8, the decelerator 14 is disposed at a position between the motor shaft 105 and the output shaft 15, where there is an amount of play between the motor shaft 105 and the output shaft 15, including gear backlash in mechanisms between the motor shaft 105 and the output shaft 15. As described above, the motor 10 of the present embodiment may be a DC brushless motor. As such, when the power supply to the motor 10 is stopped, the motor shaft 105 may rotate within the limits of the play between the mechanisms due to cogging torque or like forces. Such rotation and forces may cause a separation of the motor shaft 105 from the decelerator 14.

When the motor 10 rotates in a separation state, in which a separation is caused between the motor shaft 105 and the decelerator 14, the motor 10 rotates in a free-wheeling state, that is, the rotation of the motor 10 is not transmitted to the output shaft 15 until the motor shaft 105 abuts to the decelerator 14, as shown by an arrow Yg in the part (f) of FIG. 8.

When the power supply begins (i.e., when the power supply is started for the switching of the shift ranges from a power supply OFF state to a power supply ON state), the motor 10 may be rotated by an additional or "surplus" amount, when a position of the motor shaft 105 is within a range of play that may not be determinable, or when a the motor 10 is started from an abutment state where the motor shaft 105 and the decelerator are abutting or in contact with each other.

The target angle setter 53 sets the target count value Cen* based on the actual count value Cen when detecting the edge of the signals P1, P2, NP1, and NP2.

A drive control process including a requested value set process is described based on the flowcharts shown in FIGS. 9-12. This process is performed by the ECU 50 at a predetermined cycle, when a start switch such as an ignition switch or the like is turned ON.

At S101, the shift lever (not illustrated) is operated by a driver and the ECU 50 determines whether a driver requested shift range is changed from the P range to the NotP range or from the NotP range to the P range. When the driver requested shift range is determined to not change from the NotP range to the P range or from the P range to the NotP range (S101:NO), the process proceeds to S103. When the driver requested shift range is determined to change from the NotP range to the P range or from the P range to the NotP range (S101:YES), the process proceeds to S102.

At S102, the target angle setter 53 sets the target count value Cen* to a default value Cen*_df. The default value Cen*_df is a value based on an angle between the recesses 22 and 23.

At S103, the ECU 50 sets a power supply flag to ON that indicates electric power is being supplied to the motor 10. The ON-OFF processing of the power supply flag may be performed by the switch controller 75, or may be performed by one or more components other than the switch controller 75.

At S104, the switch controller 75 determines whether the power supply flag is turned ON. When the power supply flag is determined to be turned OFF (S104:NO), the process proceeds to S105. When the power supply flag is determined to be turned ON (S104:YES), the process proceeds to a target angle correction process at S200. The target angle correction process at S200 is described in further detail below with respect to FIGS. 11 and 12.

At S105, the ECU 50 resets various timers and flags described in greater detail below.

At S106, the target count value Cen* is determined as whether it equals a signal abnormal time target value Cen*_err. When the target count value Cen* is determined to equal the signal abnormal time target value Cen*_err (S106:YES), the process proceeds to S107. Processing of S107 and S108 are described in greater detail below. When the target count value Cen* is determined to not equal the signal abnormal time target value Cen*_err (S106:NO), the process proceeds to S109.

At S109, the switch controller 75 determines whether the angle deviation e, which is a difference between the target count value Cen* and the actual count value Cen, is larger than an angle determination threshold e_th. The target count value Cen* used here is the default value Cen*_df or a post-correction target count value Cen*_#. The angle deviation e corresponds to a difference value between a target angle and an actual angle. The angle determination threshold e_th is set to a number of counts that corresponds to a predetermined value close to zero. For example, close to zero may be a mechanical angle of 0.5 degrees. When the angle deviation e is determined to be equal to or smaller than the angle determination threshold e_th (S109:NO), the process proceeds to S110. When the angle deviation e is determined to be larger than the angle determination threshold e_th (S109:YES), the process proceeds to S300.

At S300, the switch controller 75 selects a feedback control as the control state of the motor 10. That is, the motor 10 is controlled by a feedback control that feeds back a motor position and a motor speed when the angle deviation e is larger than the angle determination threshold e_th.

Figure 10:
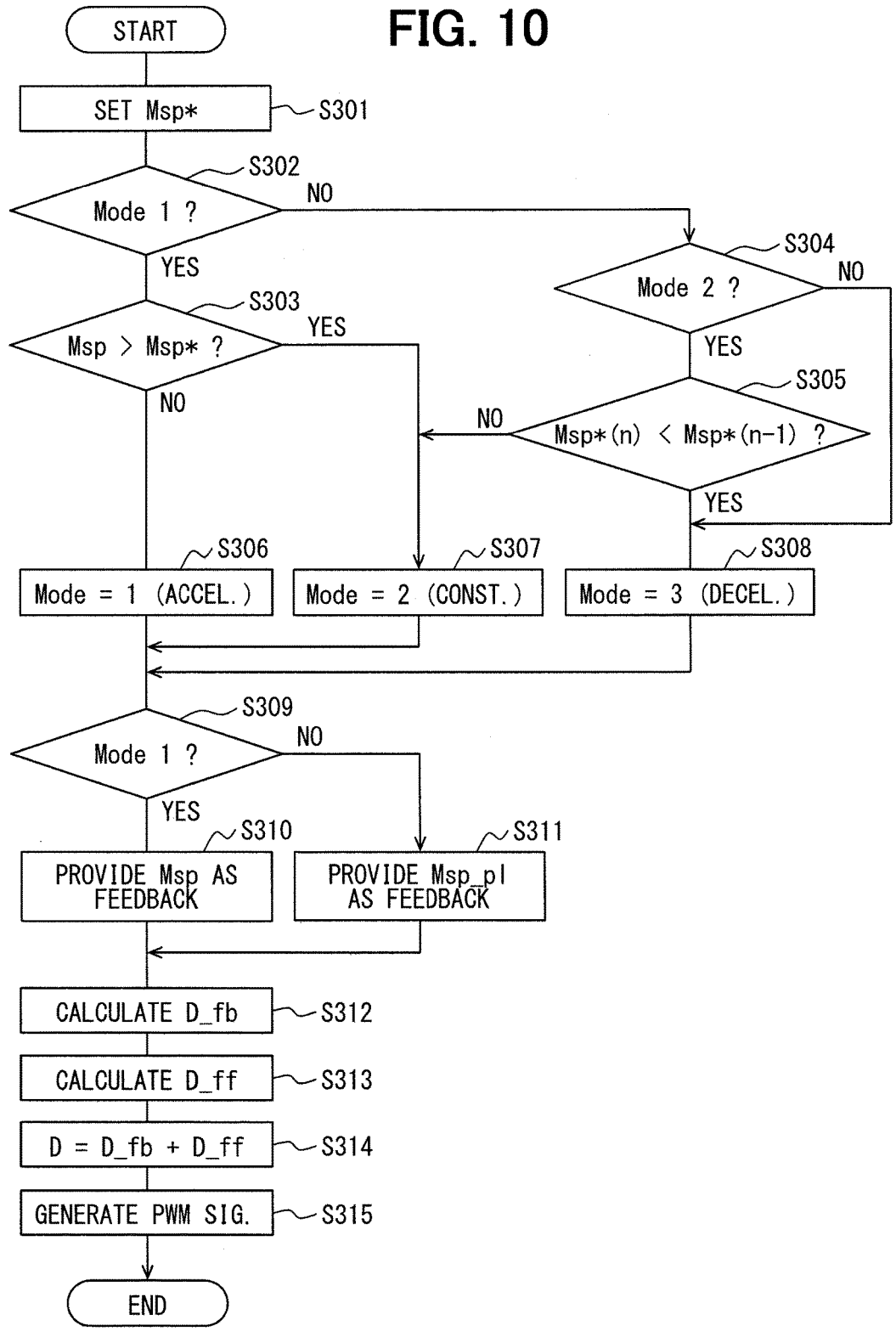
FIG. 10 is a flowchart of a feedback control.

A portion of the feedback control process is shown in FIG. 10. The speed state of the motor 10 is set to the mode 1 (i.e., to the acceleration state) immediately after turning ON of the power supply flag.

At S301, the target speed setter 62 sets the target motor speed Msp* based on the angle deviation e and the battery voltage V.

At S302, the feedback controller 60 determines whether the current speed state is mode 1. When the current speed state is determined to not be mode 1 (S302:NO), the process proceeds to S304. When the current speed state is determined to be mode 1 (S302:YES), the process proceeds to S303.

At S303, the feedback controller 60 determines whether the motor speed Msp is larger than the target motor speed Msp*. When the motor speed Msp is determined to be equal to or smaller than the target motor speed Msp* (S303:NO), the process proceeds to S306, and mode 1 (i.e., the acceleration state) is maintained as the speed state. When the motor speed Msp is determined to be larger than the target motor speed Msp* (S303:YES), the process proceeds to S307, and the speed state is changed from mode 1 (i.e., the acceleration state) to mode 2 (i.e., the steady state).

At S304, the feedback controller 60 determines whether the current speed state is mode 2. When the current speed state is determined to not be mode 2 (S304:NO) (i.e., when the current speed state is determined to be mode 3), the process proceeds to S308 and mode 3 (i.e., the deceleration state) is maintained as the speed state. When the current speed state is determined to be mode 2 (S304:YES), the process proceeds to S305.

At S305, the feedback controller 60 determines whether the current value of the target motor speed is smaller than the previous value of the target motor speed Msp*. In FIG. 10, the current value of the target motor speed is designated as Msp* (n), and the previous value of the target motor speed Msp* is designated as Msp* (n−1). When the current value of the target motor speed Msp* (n) is determined to be equal to or larger than the previous value Msp* (n−1) (S305:NO), the process proceeds to S307, and mode 2 (i.e., the steady state) is maintained as the speed state. When the current value of the target motor speed Msp* (n) is determined to be smaller than the previous value Msp* (n−1) (S305:YES), the process proceeds to S308, and the speed state is changed from mode 2 (i.e., the steady state) to mode 3 (i.e., the deceleration state).

At S309, the feedback controller 60 determines whether the speed state of the motor 10 is mode 1. When the speed state is determined to be mode 1 (S309:YES), the process proceeds to S310. When the speed state is determined to not be mode 1 (i.e., when the speed state is mode 2 or mode 3) (S309:NO), the process proceeds to S311.

At S310, the FB value setter 63 outputs the motor speed Msp as the speed feedback value Msp_fb to the speed deviation calculator 64.

At S311, the FB value setter 63 outputs, to the speed deviation calculator 64, the speed phase advance value Msp_pl as the speed feedback value Msp_fb.

At S312, the controller 65 calculates the FB duty D_fb.

At S313, the FF correction value calculator 66 calculates the FF duty D_ff according to the speed state.

At S314, the FF term corrector 67 adds the FB duty D_fb and the FF duty D_ff, and calculates the duty instruction value D.

At S315, the PWM signal generator 69 generates a PWM signal based on the duty instruction value after performing a voltage correction on the duty instruction value D. The drive of the motor 10 is thus controlled by controlling the ON-OFF operation of the switching elements 411-416 and 421-426 based on the generated PWM signal.

Distinction between the speed states may be recognized by using a differential value of the motor speed Msp or by using other methods.

Figure 9:
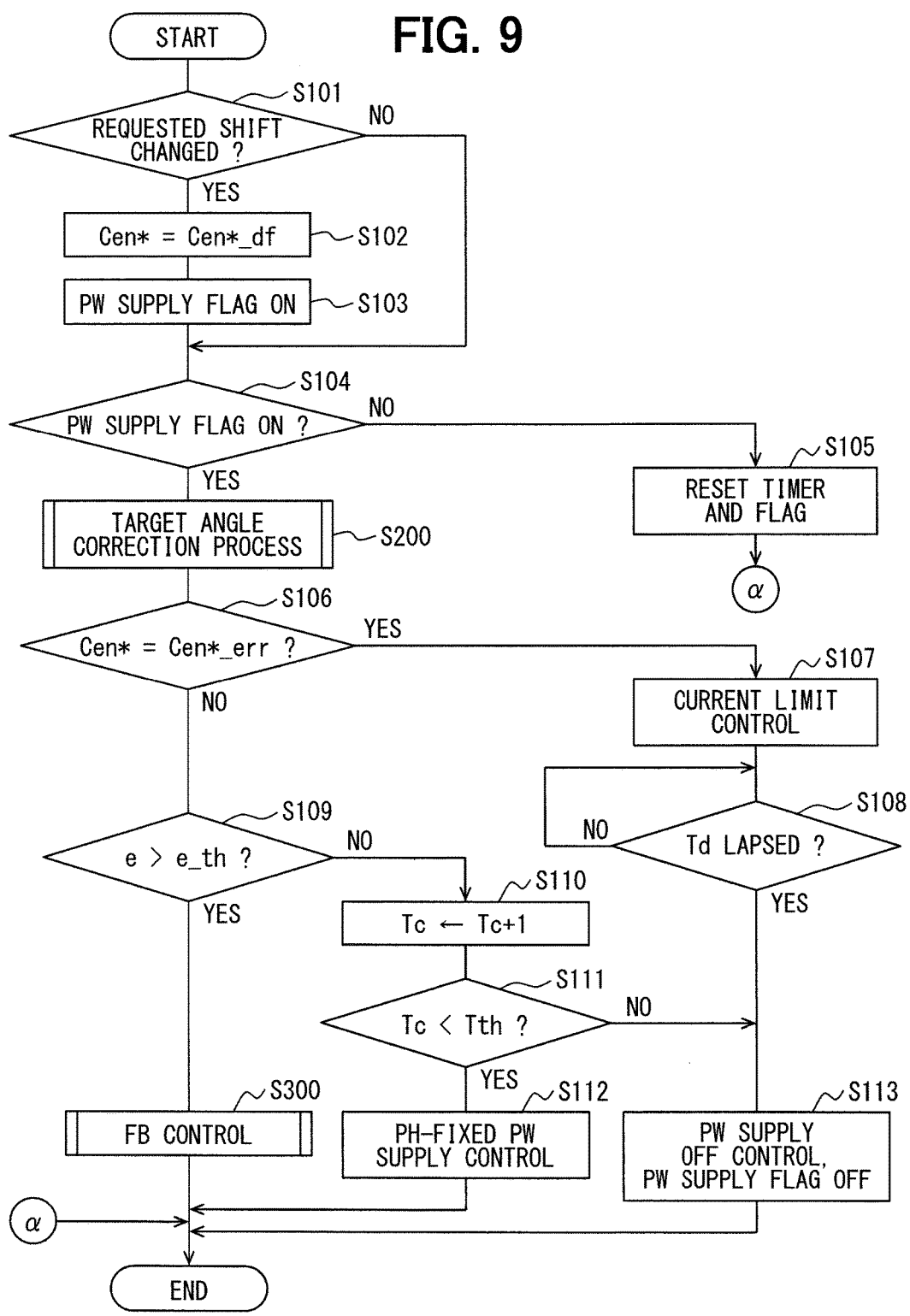
FIG. 9 is a flowchart of a drive control process.

With reference to FIG. 9, at S110, the switch controller 75 increments a timer value Tc that is a count value of a timer that clocks a continuation time of the phase-fixed power supply control.

At S111, the switch controller 75 determines whether the timer value Tc is smaller than a continuation time threshold Tth. The continuation time threshold Tth is a value that is set based on a power supply continuation time Ta (e.g., 100 ms) during which the phase-fixed power supply control is continued. When it is determined that the timer value Tc is smaller than the continuation time threshold Tth (S111:YES), the process proceeds to S112. When the timer value Tc is determined to be equal to or greater than the continuation time threshold Tth (S111:NO), the process proceeds to S113.

At S112, the switch controller 75 selects the phase-fixed power supply control as the control state of the motor 10.

At S113, which is subsequent to a determination of (i) when the power supply continuation time has lapsed after starting the phase-fixed power supply control, or (ii) when a restriction continuation time Td has lapsed after starting a current restriction control to be mentioned later, the switch controller 75 puts the control state of the motor 10 in a power supply OFF control. In the power supply OFF control, a signal which turns OFF all the switching elements 411-416 and 421-426 of the motor drivers 41 and 42 is output to the motor drivers 41 and 42, and the switching elements 411-416 and 421-426 are all turned OFF. Thereby, at the time of the power supply OFF control, an electric power is not supplied toward the motor 10. Note that, since the motor relays 46 and 47 continue to be turned ON while the start switch is turned ON, the motor relays 46 and 47 are also turned ON during the power supply OFF control. The ECU 50 sets the power supply flag to OFF.

Figure 11:
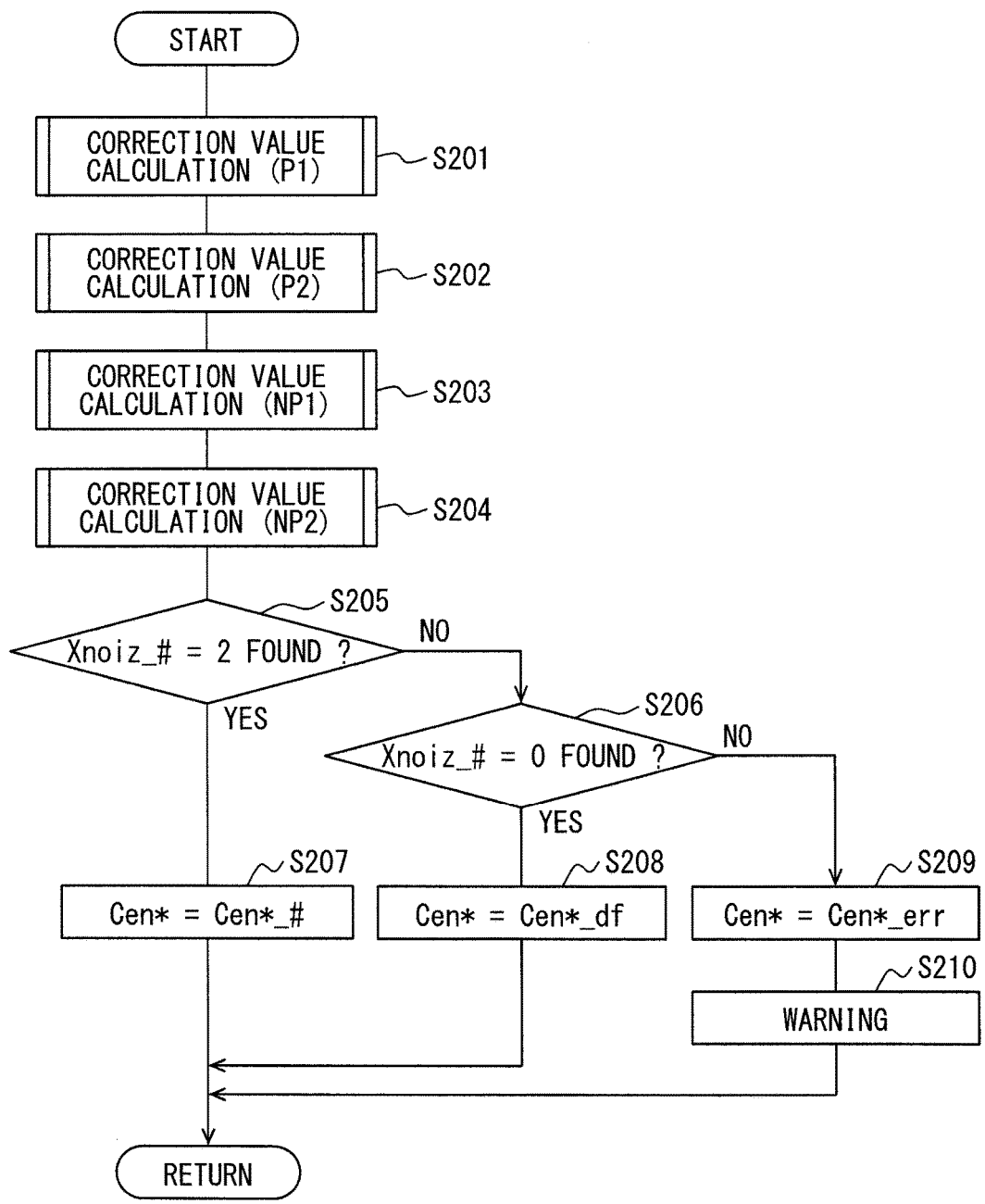
FIG. 11 is a flowchart of a target correction process.
Figure 12:
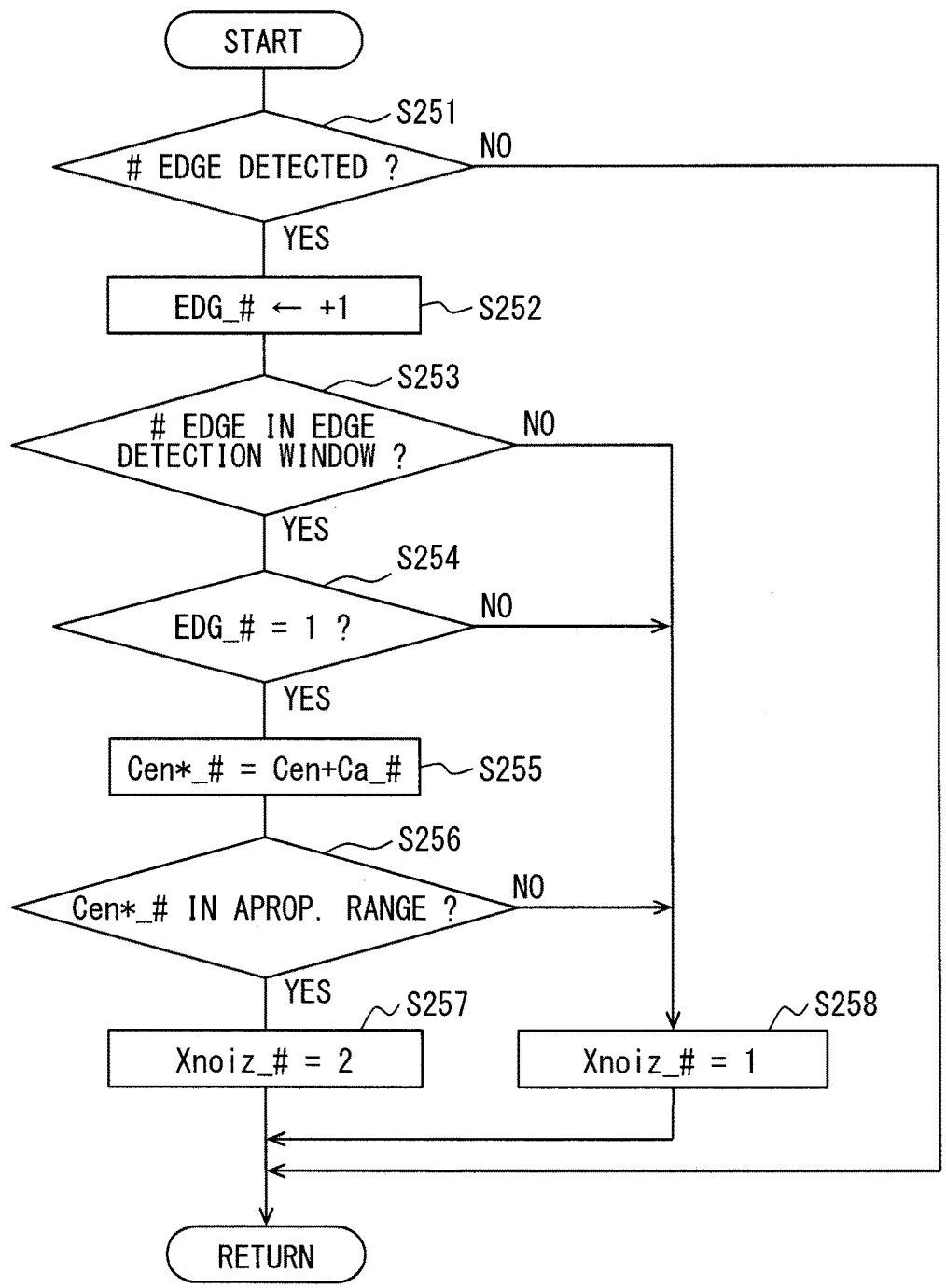
FIG. 12 is a flowchart of a correction value calculation process.

With reference to FIGS. 11 and 12, a target correction process is described. As used herein, "#" indicates one of P1, P2, NP1, or NP2.

At S201, the target angle setter 53 performs a correction value calculation based on the signal P1.

At S202, the target angle setter 53 performs the correction value calculation based on the signal P2.

At S203, the target angle setter 53 performs the correction value calculation based on the signal NP1.

At S204, the target angle setter 53 performs the correction value calculation based on the signal NP2.

A correction value calculation process at S201-S204 is described based on a flowchart in FIG. 12. The following example assumes the correction value calculation of the signal P1 in S201. That is, the processes described in S251-S258 of FIG. 12 assume that #=P1, as an example, but any of P2, NP1, and NP2 may be substituted in place of P1.

At S251, the target angle setter 53 determines whether an edge of the signal P1 is detected. When the signal P1 switches from ON to OFF, or from OFF to ON, it is determined that an edge has been detected. When it is determined that an edge of the signal P1 is not detected (S251:NO), processing at S252 and subsequent processes are not performed, and the correction value calculation process is ended. When ending the process in a current cycle, a noise flag Xnoiz_P1 is set as "0." The noise flag Xnoiz_# is described in greater detail below. When it is determined that an edge of the signal P1 is detected (S251: YES), the process proceeds to S252.

At S252, the target angle setter 53 increments an edge counter EDG_P1. The edge counter EDG_# is a counter for each signal.

At S253, the target angle setter 53 determines whether the actual count value Cen of the motor 10 is currently in a P1 edge detection window. The P1 edge detection window is set as a range where an edge of the signal P1 can be detected taking into account the edge variation/edge deviation of the P1 signal and the free-wheeling state of the motor 10. When the actual count value Cen is determined to not be in the P1 edge detection window (S253:NO), the process proceeds to S258. When the actual count value Cen is determined to be in the P1 edge detection window (S253:YES), the process proceeds to S254.

At S254, the target angle setter 53 determines whether the count value of the edge counter EDG_P1 equals 1. When the count value of the edge counter EDG_P1 is determined to be equal to or greater than 2 (S254:NO), the process proceeds to S258. When the count value of the edge counter EDG_P1 is determined to be 1 (S254:YES), the process proceeds to S255.

At S255, the target angle setter 53 calculates a post-correction target count value Cen*_P1 based on the signal P1. The post-correction target count value Cen*_P1 is represented by an equation 1.

$$Cen^*\_P1 = Cen + Ca\_P1 \qquad \text{(Equation 1)}$$

Cen in the equation 1 is a currently observed encoder count value of the motor 10.

A correction amount Ca_P1 is set according to the driver requested shift range. More practically, the correction amount Ca_P1 used when switching from the P range to the NotP range is a design value based on an angle between an edge detection center of the P1 signal and a center of the recess 22. The correction amount Ca_P1 used when switching from the NotP range to the P range is a design value based on an angle between an edge detection center of the signal P1 and a center of the recess 23.

At S256, the target angle setter 53 determines whether the post-correction target count value Cen*_P1, which is calculated at S255, is in an appropriate range. When it is determined that the post-correction target count value Cen*_P1 is outside the appropriate range (S256:NO), the process proceeds to S258. When it is determined that the post-correction target count value Cen*_P1 is in the appropriate range (S256:YES), the process proceeds to S257.

At S257, the target angle setter 53 sets the noise flag Xnoiz_P1 to 2.

At S258, the target angle setter 53 sets the noise flag Xnoiz_P1 to 1. In case that the post-correction target count value Cen*_P1 is calculated before proceeding to S258, such a value is cancelled.

When an edge of the signal P1 is not detected, it is assumed that Xnoiz_P1=0. In such case, the calculation of the post-correction target count value Cen*_P1 has not yet been performed. When noise/signal chattering occurs in the P1 signal, it is assumed that Xnoiz=1. In such case, when the post-correction target count value C en*_P1 has already been calculated, such a value is cancelled. When the signal P1 is normal, that is, a noise-free or chatter-free signal, and one edge is detected in the edge detection window, it is assumed that Xnoiz=1. In such case, the post-correction target count value Cen*_P1 which can be reflected and used as the target count value Cen* is calculated.

Since the signal P1 and the signal P2 have the same waveform, the correction value calculation process for the signal P2 is the same as the process used for the signal P1. When the detection accuracy of each of the switches 161 and 162 differs from the other, the range of the edge detection window may also differ from switch 161 to switch 162. The same applies to the switches 163 and 164.

Since the signal NP1 is a different signal than the signal P1, the range of the edge detection window and the correction amount Ca_NP1 is different for the signal NP1. The edge detection window of the signal NP1 is set as a range in which an edge of the signal NP1 is possibly detectable in consideration of the edge variation/deviation of the signal NP1 and the free-wheeling rotation.

The correction amount Ca_NP1 is a value that is set according to the driver requested shift range. When switching from the P range to the NotP range, the correction amount Ca_NP1 is a design value based on an angle between an edge detection center of the signal NP1 and a center of the recess 22. The correction amount Ca_NP1 when switching from the NotP range to the P range is a design value based on an angle between an edge detection center of the signal NP1 and a center of the recess 23.

Since the signal NP1 and the signal NP2 have the same waveform, the correction value calculation process of the signal NP2 may be the same as the correction value calculation process of the signal NP1.

With reference to FIG. 11, at S205, the target angle setter 53 determines whether the noise flag Xnoiz_#=2 is found. When it is determined that the noise flag Xnoiz_#=2 is found (i.e., when the post-correction target count value Cen*_# is correctly calculable based on at least one of the signals P1, P2, NP1, and NP2) (S205:YES), the process proceeds to S207. When it is determined that no noise flag Xnois_#=2 is found (i.e., when the post-correction target count value Cen*_# is not correctly calculable) (S205:NO), the process proceeds to S206.

At S206, the target angle setter 53 determines whether the noise flag Xnoiz_#=0 is found. When it is determined that the noise flag Xnoiz_#=0 is found (i.e., when an edge not-yet-detected signal is found) (S206:YES), the process proceeds to S208. Even if an affirmative determination is made at S206 after passing through all the edge detection windows, the process may proceed to S209. When it is determined that no noise flag Xnoiz_#=0 is found (S206: NO), the process proceeds to S209.

At S207, the target angle setter 53 selects the correctly calculated post-correction target count value Cen*_#, and reflects the selected value to the target count value Cen*.

When a plurality of post-correction target count values Cen*_# are correctly calculated, any one of the correctly calculated values may be selected.

Assuming the post-correction target count values Cen*_# based on all the signals P1, P2, NP1, and NP2 are correctly calculated, when a difference "P" between the post-correction target count values Cen*_P1 and Cen*_P2 differs from a difference "NP" between the post-correction target count values Cen*_NP1 and Cen*_NP2, the pair of signals having the smaller of the two differences is assumed to be more reliable than the other pair. For example, if the difference P between the post-correction target count values Cen*_P1 and Cen*_P2 is smaller than the difference NP between the post-correction target count values Cen*_NP1 and Cen*_NP2, a reliability of the signals P1 and P2 is considered to be higher than a reliability of the signals NP1 and NP2. In such case, one of the two post-correction target count values Cen*_P1 and Cen*_P2 may be selected, or an average value of the two or the like may be selected.

When switching from the P range to the NotP range, the post-correction target count values Cen*_NP1 and Cen*_NP2 may be selected in a prioritized manner. Similarly, when switching from the NotP range to the P range, the post-correction target count values Cen*_P1 and Cen*_P2 may be selected in a prioritized manner.

At S208, the target angle setter 53 sets the target count value Cen* to the default value Cen*_df.

At S209, the target angle setter 53 sets the target count value Cen* to the signal abnormal time target value Cen*_err.

At S210, the ECU 50 turns ON a warning lamp on an instrument panel to warn a user of an abnormality, malfunction, or error with the shift-by-wire system 1. The user may also be alerted to a malfunction by a sound, such as a warning chime, bell, or buzzer, or by other alerting means. By providing a warning to the user, the user can recognize that he/she is requested to bring the vehicle to a repair shop or the like.

With reference to FIG. 9, at S107, the drive controller 55 performs the current restriction control based on the signal abnormal time target value Cen*_err, which in this case, is the target count value Cen*. The signal abnormal time target value Cen*_err is a value larger than a target value that is used to rotate the motor 10 to switch to the requested shift range when an amount of the free-wheeling rotation is assumed to be at the maximum amount. The signal abnormal time target value Cen*_err may be set to a maximum settable value (e.g., "9999") or the like. By setting the target count value Cen* to the signal abnormal time target value Cen*_err, the motor 10 is rotated so that the detent roller 26 contacts a wall 225 or a wall 235 (as shown in FIG. 8). More practically, when switching from the P range to the NotP range, the detent roller 26 abuts or contacts wall 225, and, and when switching from the NotP range to the P range, the detent roller 26 abuts or contacts the wall 235.

The drive controller 55 restricts the rotation speed of the motor 10 by the current restriction control. In the present embodiment, a duty is restricted to a predetermined low speed rotation value. By performing the current restriction control, the shock of the impact when the detent roller 26 contacts the walls 225 or 235 is reduced.

At S108, the drive controller 55 determines whether the restriction continuation time Td has lapsed after starting the current restriction control. The restriction continuation time Td is set as a period of time that is longer than a period of time taken for the detent roller 26 to reach an intended recess when the motor 10 is controlled by the current restriction control. When it is determined that the restriction continuation time Td has not lapsed after starting the current restriction control (S108:NO), the present determination process at S108 is repeated. When it is determined that the restriction continuation time Td has lapsed after starting the current restriction control (S108:YES), the process proceeds to S113, and the control state of the motor 10 is set to the power supply OFF control.

Figure 13:
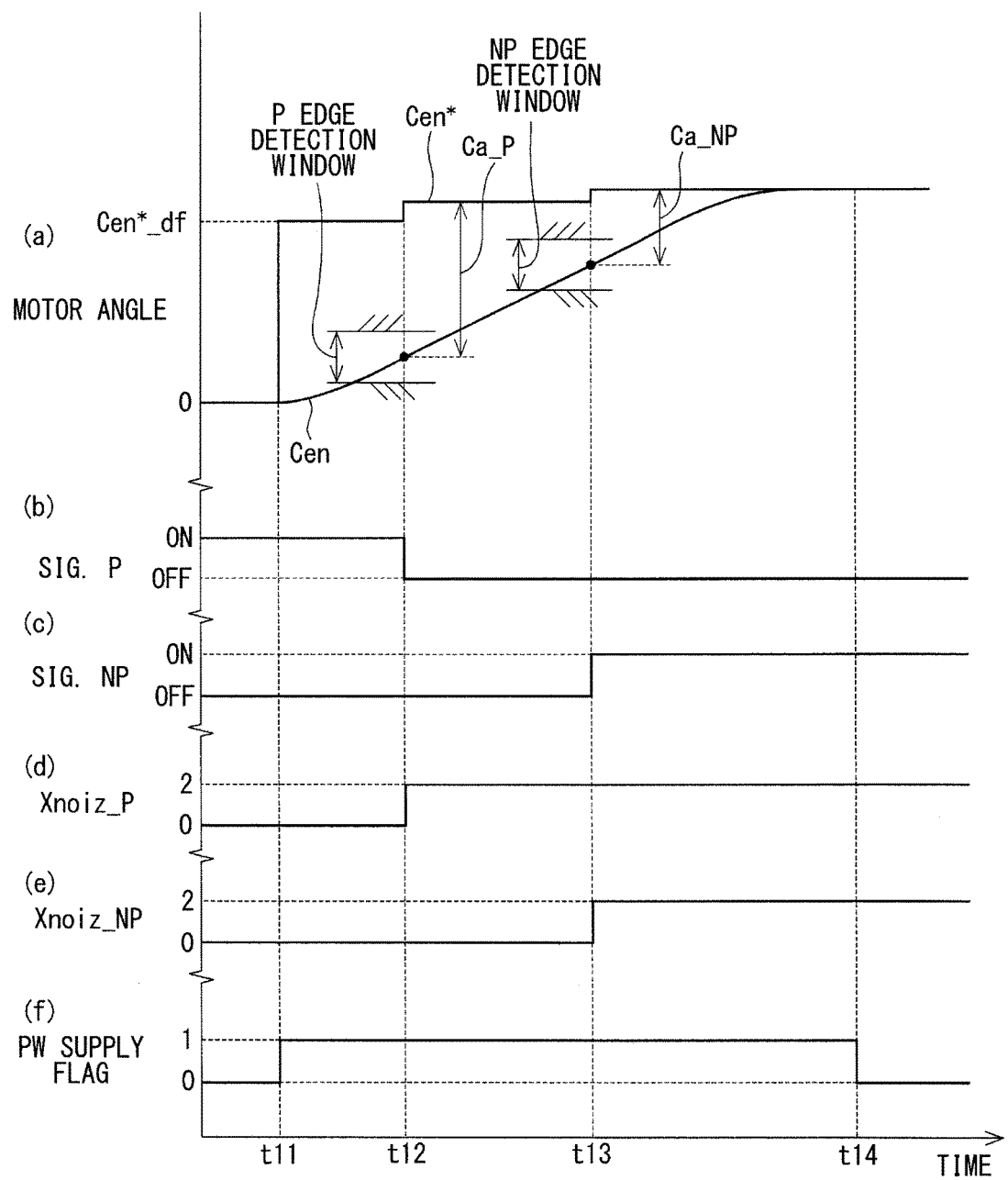
FIG. 13 illustrates a timing diagram of a drive control process.

The drive control process of the present embodiment is described based on the timing chart of FIG. 13. In FIG. 13, row (a) shows the motor angle, row (b) shows the signal P, row (c) shows the signal NP, row (d) shows the noise flag Xnoiz_P, row (e) shows the noise flag Xnoiz_NP, and row (f) shows a power supply flag. The motor angle is represented by the count value of the encoder 13 in row (a) of FIG. 13. Since the signal P1 and the signal P2 are basically duplex system signals, i.e., the same signals having the same waveform, they are collectively represented as the "signal P" in row (b) of FIG. 13. Similarly, since the signal NP1 and the signal NP2 are the same duplex system signals, i.e., the same signals having the same waveform, they are collectively represented as the "signal NP" in row (c) of FIG. 13. Similarly, the noise flag associated with the signal P1 and the noise flag associated with the signal P2 are collectively represented as the noise flag Xnoiz_P, and a noise flag associated with the signal NP1 and a noise flag associated with the signal NP2 are collectively represented as the noise flag Xnoiz_NP. FIG. 13 illustrates, as an example, a situation in which one edge is correctly detected in a detection window.

When a driver requested shift range switches from the P range to the NotP range at time t11, the power supply flag switches from OFF to ON. The switch controller 75 switches the control state of the motor 10 from the power supply OFF control to the feedback control, and the motor 10 is rotated by such control. At such timing, the target count value Cen* is set to the default value Cen*_df.

At time t12, the signal P switches from ON to OFF, and an edge of the signal P is detected. Since this edge is detected when the actual count value Cen is in the P edge detection window, the noise flag Xnoiz_P is set to 2 (i.e., Xnoiz_P=2), and the correction amount Ca_P is added to the actual count value Cen of time t12 at which the edge is detected, and the post-correction target count value Cen*_P is calculated. Further, the calculated post-correction target count value Cen*_P is reflected to the target count value Cen*.

At time t12, the NP edge detection window has not yet occurred and an edge of the signal NP is not yet detected, so the noise flag Xnoiz_NP is, or stays as, zero (i.e., Xnoiz_NP=0).

At time t13, the signal NP switches from OFF to ON, and an edge of the signal NP is detected. Since this edge is detected when the actual count value Cen is in the NP edge detection window, the noise flag Xnoiz_NP is set to two (i.e., Xnoiz_NP=2), and the correction amount Ca_NP is added to the actual count value Cen of time t13 at which the edge is detected, and the post-correction target count value Cen*_NP is calculated. The post-correction target count value Cen*_NP is selected and reflected to the target count value Cen*.

Based on the angle deviation e, the feedback control and the phase-fixed power supply control are switched so that the motor 10 stops at the target count value Cen*. After switching to the phase-fixed power supply control, the power supply flag is turned OFF at time t14, i.e., when the power supply continuation time Ta has lapsed.

In the present embodiment, when the angle deviation e is equal to or smaller than the angle determination threshold e_th, the control state of the motor 10 is switched from the feedback control to the phase-fixed power supply control. By performing the phase-fixed power supply, the motor 10 can be quickly stopped. By continuing the phase-fixed power supply control for the power supply continuation time Ta, the motor 10 can be securely stopped and the detent roller 26 can be appropriately rolled into an intended recess based on the user's requested shift range.

In the present embodiment, since the DC brushless motor is used as the motor 10 and the feedback control is performed when the angle deviation e is larger than the angle determination threshold e_th, responsiveness can be improved. Since the speed phase advance value Msp_pl has undergone a phase advance filtering process, it is used as a feedback value when the speed state is the steady state or the deceleration state, so that an unwanted oscillation such as a hunting oscillation can be limited or prevented.

In the present embodiment, when a plurality of edges are detected for the signal P, or when an edge is detected at a position outside the P edge detection window, the signal P may be affected by a noise and/or chatter. In such cases, the correction of the target count value Cen* based on the signal P is invalidated.

Similarly, when a plurality of edges are detected for the signal NP, or when an edge is detected outside the NP edge detection window, the signal NP may be affected by noise and/or chatter, and the correction of the target count value Cen* based on the signal NP is invalidated.

In such manner, erroneous correction of the target count value Cen* by a noise-affected signal is limited or prevented.

In the present embodiment, the signal P and the signal NP are respectively duplexed, and the correction of the target count value Cen* is performable based on a total of four signals. If a normal edge is detected for at least one of the four signals, the target count value Cen* can be corrected. After starting the drive of the motor 10, the rotation of the motor 10 during the free-wheeling rotation (i.e., until the motor shaft 105 abuts or contacts the decelerator 14) is controlled based on the target count value Cen* that is corrected based on the free-wheeling rotation, so that the motor 10 can be appropriately controlled and the detent roller 26 can be appropriately rolled into the intended recess.

When a single edge of any signal cannot be detected, a wall abutment control is performed, in which the motor 10 is controlled with a restricted electric current so that the detent roller 26 contacts or abuts the wall 225 or the wall 235. In such manner, even when the edge detection cannot be performed for all the signals, the switching of the shift range may still be performed.

As described above, the shift range controller 40 switches the shift range by controlling the drive of the motor 10.

The shift range controller 40 is provided with the target angle setter 53 and the drive controller 55.

The output shaft sensor 16 turns the plurality of switches 161-164 ON and OFF at the rotation positions of the output shaft 15 corresponding to the respective shift ranges, when the output shaft 15 is rotatably driven by the motor 10.

The target angle setter 53 obtains the signals P1, P2, NP1, and NP2 from the output shaft sensor 16, i.e., from each of the switches 161-164. The target angle setter 53 can correct and set, or correctively set, the target count value Cen* that corresponds to the requested shift range, according to each of the signals P1, P2, NP1, and NP2.

The drive controller 55 controls the drive of the motor 10 based on the target count value Cen*.

A rising edge or a falling edge of each of the signals P1, P2, NP1, and NP2 is detected as an edge. That is, the respective signals P1, P2, NP1, and NP2 are recognized, i.e., detected, by the edge.

The target angle setter 53 calculates the post-correction target count value Cen*_# for each of the signals P1, P2, NP1, and NP2. More practically, the target angle setter 53 calculates, for the signal P1, the post-correction target count value Cen*_P1 based on the actual count value Cen. Cen is a rotation angle of the motor 10 at the time of edge detection, when the legitimate number of edges (i.e., 1 edge in the present embodiment) are detected in the P1 edge detection window. The P1 edge detection window is a detection range/window corresponding to the signal P1. When more than the legitimate number of edges is detected for the signal P1, or, when the detected edge is detected outside the P1 edge detection window, correction of the target count value Cen* based on the signal P1 is invalidated.

The same applies to the signals P2, NP1, and NP2.

Since, the output shaft sensor 16 has the plurality of switches 161-164 and can correct the target count value Cen* based on each of the signals P1, P2, NP1, and NP2 from the switches 161-164, when at least one of the signals P1, P2, NP1, and NP2 is normal, i.e. noise-free, the target count value Cen* can be corrected appropriately.

When more than the legitimate number of edges is detected, or when the detected edge is detected outside the detection window, correction of the target count value Cen* based on the corresponding signal is invalidated, thereby limiting the erroneous correction of the target count value Cen* for noise-affected signals.

When the correction of the target count value Cen* based on all the signals P1, P2, NP1, and NP2 is invalid, the target angle setter 53 sets the target count value Cen* to the signal abnormal time target value Cen*_err. The signal abnormal time target value Cen*_err is a larger value than the default value Cen*_df and set according to the shift ranges before and after the shift range switching.

The drive controller 55 performs the current restriction control that restricts the electric current flowing toward the motor 10. The drive controller 55 turns OFF the power supply to the motor 10 when the restriction continuation time Td has lapsed after starting the current restriction control.

In such manner, even when a noise/chatter affects signals P1, P2, NP1, and NP2, the switching of the shift range may still be performed.

As used herein, the target count value Cen* may be referred to as a "motor angle target value", the post-correction target count value Cen*_# may be referred to as a "post-correction motor angle target value", and the actual count value Cen may be referred to as a "motor angle." The signals P1, P2, NP1, and NP2 may be referred to as "output shaft signals" and the edge detection window may be referred to as a "detection range."

Other Embodiments (Target Correction Process)

In the above-mentioned embodiment, when the signal P switches from one of ON/OFF to the other (i.e., ON to OFF, or OFF to ON), it is determined that an edge is detected. In other embodiments, when the signal P switches from ON to OFF, for example, it may be determined that an edge is detected when switching OFF of the signal P is detected successively by a preset number of times, e.g., three times in a row. The same may apply to OFF to ON switching and to the signal NP. When the edge detection is performed by the detection of the preset number of times of ON or OFF, the post-correction target count value is calculated based on the motor angle when the switching from one of ON/OFF to the other is detected for the first time.

In the embodiment described above, the legitimate number of edge detections is set to 1. In other embodiments, the legitimate number of edge detections may be set to 2 or more.

In the embodiment described above, every time an edge is detected, the motor angle target value is corrected. In other embodiments, when switching from the P range to the NotP range, after passing through the NP edge detection window, the motor angle target value may be corrected. In other embodiments, when switching from the P range to the NotP range, the motor angle target value may be corrected based on the signal P after passing through the P edge detection window, and the motor angle target value may be corrected based on the signal NP after passing through the NP edge detection window. That is, the motor angle target value may be corrected based on a certain output shaft signal after passing through a detection range of that output shaft signal. The same applies to switching from the NotP range to the P range.

In the embodiment described above, when the correction of the motor angle target value by all the output shaft signals is invalid, the motor angle target value is set to the signal abnormal time target value, and the motor is driven by the current restriction control.

In another embodiment, when the correction of the motor angle target value by all the output shaft signals is invalid, the power supply to the motor is turned OFF upon determination of such invalidity, and the shift range switching may be prohibited as well.

(Output Shaft Sensor)

In the embodiment described above, the output shaft sensor is provided with two P switches for detecting the P range and two NP switches for detecting the NotP range. In other embodiments, the switch for respective shift ranges may be only one, or three or more.

(Motor)

In the embodiment described above, the motor is a permanent magnet-type three-phase brushless motor. In another embodiment, the motor may be a motor of any kind, such as an SR motor or the like. In the embodiment described above, two sets of winding groups are provided in the motor. In another embodiment, only one winding group may be provided for the motor, or three or more sets of winding groups may be provided as well. Control methods other than the control method described for the embodiment above, may be used to control the motor.

In the embodiment above, the encoder is used as a rotation angle sensor that detects the rotation angle of the motor. In other embodiments, any device such as a resolver or the like may be used as the rotation angle sensor.

(Range Switch Mechanism)

In the embodiment described above, two recesses are provided on the detent plate. In other embodiments, the number of concave-shaped recesses may be three or more. When three or more recesses are provided, a corresponding number of switches of the output shaft sensor may be provided.

The shift range switch mechanism, the parking lock mechanism, and the like, may be different from the above-described embodiment.

Various changes and modifications will become apparent to those skilled in the art, and such changes, modifications, and summarized schemes are to be understood as being within the scope of the present disclosure as defined by appended claims.

What is claimed is:

1. A shift range controller for switching shift ranges by controlling a motor, the shift range controller comprising:
   a target angle setter configured to
      obtain from an output shaft sensor an output shaft signal indicative of an ON-OFF position of each of a plurality of switches disposed at a plurality of rotation positions of an output shaft rotatably driven by the motor, and
      correctively set a motor angle target value corresponding to a requested shift range based on the output shaft signal from the plurality of switches; and
   a drive controller configured to control a drive of the motor based on the motor angle target value, wherein
   a rise or a fall of the output shaft signal from each of the plurality of switches is detected as an edge, and wherein
   the target angle setter is further configured to:
      detect one or more edges;
      calculate, for the output shaft signal from each of the plurality of switches, a post-correction motor angle target value based on a motor angle at an edge detection timing when a number of the one or more detected edges is at or below a threshold value and the one or more detected edges are detected in a detection range of the output shaft signal; and
      invalidate a correction of the motor angle target value based on the output shaft signal when the number of the one or more detected edges exceeds the threshold value, or when the one or more detected edges are detected outside the detection range of the output shaft signal.

2. The shift range controller of claim 1, wherein
   the target angle setter sets the motor angle target value to a signal abnormal time target value that is greater than a default value set based on the shift ranges before and after the shift range switching, when a correction of the motor angle target values is invalid, and
   the drive controller performs a current restriction control that restricts an electric current supplied to the motor.

3. The shift range controller of claim 2, wherein
   the drive controller turns OFF the power supply to the motor when a restriction continuation time has lapsed after a start of the current restriction control.

* * * * *